M. & W. EASTMAN.
MOTOR FOR AUTOMOBILES.
APPLICATION FILED NOV. 24, 1908.
923,632.
Patented June 1, 1909.
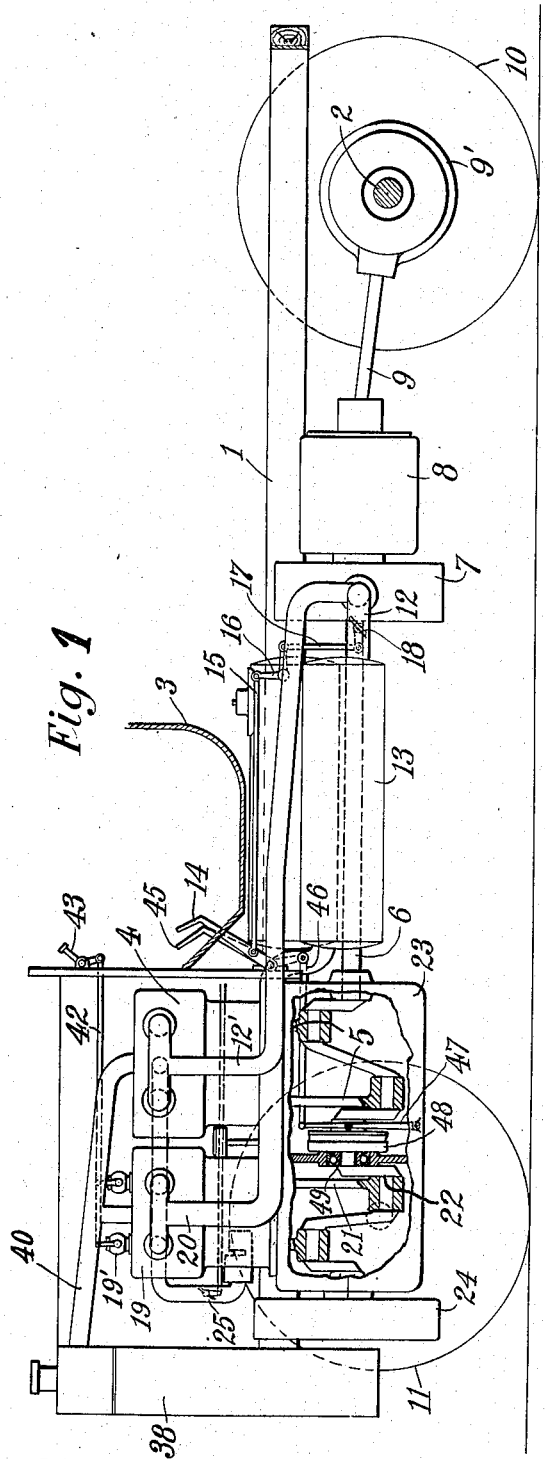
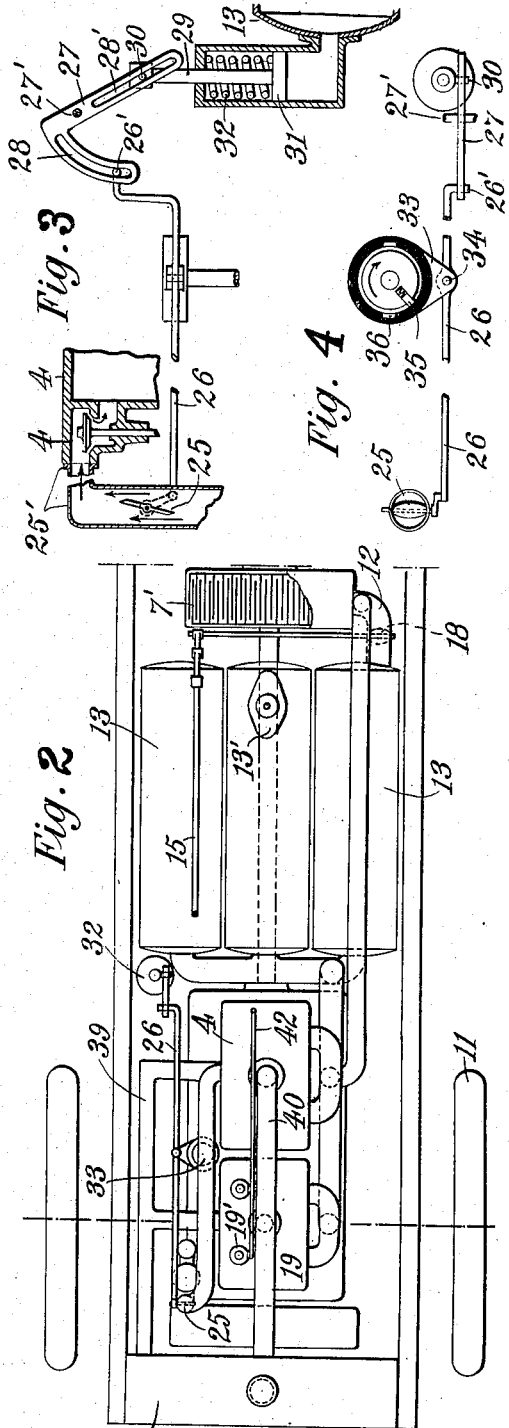

UNITED STATES PATENT OFFICE.

MORTIMER EASTMAN AND WILLIAM EASTMAN, OF ROSLYN, NEW YORK.

MOTOR FOR AUTOMOBILES.

No. 923,632.     Specification of Letters Patent.     Patented June 1, 1909.

Application filed November 24, 1908. Serial No. 464,290.

*To all whom it may concern:*

Be it known that we, MORTIMER EASTMAN and WILLIAM EASTMAN, citizens of the United States, and residents of Roslyn, in the county of Nassau and State of New York, have invented certain new and useful Improvements in Motors for Automobiles, of which the following is a specification.

The invention consists essentially of an internal combustion engine, supplemented by an air compressor and a rotary fluid motor and has for its objects the provision of means for utilizing the residual energy from an internal-combustion, or so-called primary, engine in accordance with the varying demands of the load on the system.

Further objects of the invention are to effect a maximum reduction in a vibration due to the reciprocating internal-combustion engine, the type of engine usually employed, and to effect the muffling of the exhaust gaseous products from said engine, without materially sacrificing the efficiency of the primary engine or interfering with the separate operation of the same when it may be desired.

These objects are accomplished in the power system constructed as hereinafter described in detail and illustrated in the accompanying drawings, in which—

Figure 1 is an elevation of a chassis of an automobile with the crank shaft casing of the gas engine and air compressor, partially broken away, Fig. 2 is a fragmentary longitudinal plan view of the same, with the casing of the turbine partially broken away, Fig. 3 is an elevation, chiefly, in section of the mechanism for automatically regulating the supply of combustible mixture to the engine in accordance with the varying pressure of air in the distributing chests or reservoirs, and Fig. 4 is a plan view of the same with the fragmentary sections of engine and reservoirs omitted.

The construction of the mechanism as set forth in the drawings, in detail, consists of a frame 1 supported on axles 2 and supporting the body 3, and a reciprocating internal-combustion, hydrocarbon engine, of the compression type, 4. The piston rods 5 of the aforesaid engine, which, as herein shown, is preferably of a two-cylinder type, are connected with an engine shaft 6, which is, in turn, operatively connected with a rotary fluid motor 7, preferably consisting of a turbine wheel 7' rigidly mounted on the main engine shaft. Obviously, however, if desired, the said rotary fluid motor may be in gear with said shaft and arranged to rotate at greatly increased speed as compared therewith, being directly in mesh with gearing on said shaft or connected therewith through the agency of a clutch.

The main engine shaft is connected through the agency of the usual clutch and gears contained in the casing 8, in the manner well known, with a drive-shaft 9, said drive shaft being connected through the usual series of differentials, contained within the casing 9' with the axle 2 of the rear propelling wheel of the vehicle, said vehicle being provided with rear wheels 10 and front wheels 11. The pipe 12 affords communication between the reservoir 13 which consists of three intercommunicating chests provided with a safety valve 13' that may be regulated to operate at any desired pressure, with the rotary fluid motor 7, in the manner usual in turbine construction. A second pipe 12' serves to connect the engine 4 with the said pipe 12, immediately adjacent the point that the same is secured to the casing of said turbine. In this manner we provide means for not only utilizing the heat contained in said exhaust products which are conveyed through the pipe 12' from the engine 4 to the pipe 12, to increase the efficiency of the compressed air which is introduced peripherally of the turbine wheel into the casing, but thereby an effective muffling of the exhaust gaseous products, issuing from the combustion chambers of the gas engine, is accomplished. In fact, while it would seem apparent upon a superficial consideration of the matter that the introduction of the exhaust gases from the gas engine into the rotary fluid motor would result in an appreciable loss in efficiency, owing to the reverse impulse which would be expected to be imparted therefrom to the pistons of the engine, nevertheless, as a matter of fact, the increased amount of work obtained from said rotary fluid motor is more than sufficient to offset any reverse impulse imparted as aforesaid to the pistons, and, in addition to this, the high speed at which said turbine wheel revolves renders the same an efficient balance wheel for the main engine shaft, thus largely reducing vibration of the same and causing it to revolve with a minimum of friction in its bearings. A foot-lever, or pedal 14, which projects slightly above the floor of the body of said vehicle is connected, by a series of rods and links 15, 16 and 17, with an air throttle valve 18 in the pipe 12, whereby the amount of air admitted into the turbine can be suitably regulated. The pipes 12, 12' are preferably provided with check valves at the inner ends adjacent the reservoir (not shown), in order to permit the passage of air toward the turbine only, thereby preventing the back flow either of air or the gaseous exhaust from the engine into the said reservoir, irrespective of the position of the valve 18.

A two-cylinder compressor 19, provided with relief valves 19', is operatively connected with the engine shaft 6 and thereby compressed air is introduced through the pipe or conduit 20 into the chests of the reservoir 13. Piston rods 21 are connected, by means of a crank 22, with a clutch mechanism, hereinafter described, of the main engine shaft 6 and said cranks and piston rods are suitably inclosed in a dust-proof casing 23. If desired a balance wheel 24 may be secured to the shaft as shown, although, obviously, the said balance wheel will be inoperative for the purpose intended, except when the air compressor is in operation.

In order to avoid the necessity of constant observation of the air pressure gage, we provide automatic means for throttling the mixture supplied to the combustion cylinders of the engine 4. Said means comprise a throttle valve 25 in the intake pipe 25', such as shown broken away, as it is obvious that said throttle valve may be positioned at any point intermediate the carbureter and the combustion chamber, said throttle valve being operatively connected by a system of connecting rods and levers, comprising respectively a connecting rod 26 provided with a terminal stud 26', adapted to engage with an arc-like groove 28 of a bell-crank lever 27, pivoted, as shown, at 27'. Also said lever is provided with a groove 28' in its longer arm, said groove being substantially rectilinear, which is adapted to receive a stud 30 secured to a piston rod 29 of an elastically mounted piston 31, which acts against a helical spring 32 when the pressure in said reservoir increases, and is in turn actuated by said spring as the pressure decreases. The rod 26 is pivotally secured by means of a stud 34 to a lever arm 33 of a commutator of the usual type, preferably comprising a rotatable disk 25 and a peripheral flange concentrically disposed with respect thereto and in the same plane, said disk being provided with a spring contact 35, adapted to periodically engage contact bars 36 on the innermost side of the periphery of the insulated flange. It is evident, in view of the construction described, that an increase in the pressure in the reservoir 13, would result in the upward movement of the piston 31, thereby imparting a forward movement of the connecting rod 26, and rotating the link, which connects the valve 25 with said rod, in a clockwise direction, whereby said valve will be partially closed, or entirely closed, according to the amount of increase in pressure. Simultaneously the peripheral flange of said commutator will be rotated in a clockwise direction, as indicated by the arrow and thereby the contact point will be shifted in the direction of the arrow, with the resultant reduction in speed of the engine. It is evident of course that the speed of the engine is dependent upon the time interval between successive sparks, and that the change of this time interval is the result of a change of the point in the cycle at which the charge is fired, and accordingly the ignition of the different charges of the explosive mixture, under different degrees of compression, will result from the shifting of the contact points of the commutator.

A tank 38 serves to supply a cooling fluid, such as water or denatured alcohol, or other suitable substance, to the compressors and to the internal-combustion engine, the fluid being returned to said tank through the return pipe 40, said cooling being accomplished by means of suitable jacketing of the cylinder in the manner customary heretofore.

A connecting rod 42, operated by a handle 43, serves to control the relief valves 19' of the compressor 19, and thereby said valves may be opened at will when said compressor is working thereby preventing an excessive supply of air being introduced into the reservoir 13. This is particularly advantageous in the event that the throttle valve 18 in the pipe 12, which connects the said reservoir with the rotary fluid motor, has been cut off.

A pedal 45 is connected, through the agency of a connecting link 46, with a lever 47, the latter being fulcrumed on the engine casing 23 and thereby means is afforded for operating a clutch 48, of common construction, which is adapted to optionally connect and disconnect the main shaft 49 of the compressor with the main shaft of the internal-combustion engine, to which latter the piston rods 5, of the engine, are secured.

The chief advantages of the construction herein shown, in addition to those specified herein, consist in the simplicity of construction and the ease with which the component parts of the system may be connected or disconnected when it is desired. The vehicle may be started immediately by the mere admission of the air, at any desired pressure, from the reservoir into the working chamber of the rotary fluid impact motor and also when the vehicle requires an abnormal power to be applied, either because of excessive load thereon or because of the excessive grade that it is desired to mount therewith, the supplementary power, provided by the storage reservoir and the rotary fluid motor, is not only advantageous, but, in many instances, indispensable.

It is evident that in the construction shown, the introduction of the hot, gaseous exhaust, from the engine, is not only required to increase the efficiency of the compressed air introduced therewith into the working-chamber of the turbine, but moreover, by the combination of the compressed air with these gaseous exhaust products from the engine, we are enabled to obtain an efficiency somewhat greater than could be secured, by the mere utilization of the exhaust gases from the engine, in this manner, without the addition of compressed air. In fact, in many instances, we prefer to connect the said turbine wheel with the main engine shaft by suitable gearing (not shown in drawings), such gearing including preferably a small pinion intermeshing with a large gear wheel, the latter being rigidly secured to the main engine shaft. The said small pinion may be permanently connected with the shaft of said turbine wheel or secured thereto through the agency of an intermediate clutch-mechanism, whereby the said turbine may be optionally thrust into or out of gear with said main engine shaft. The intermediate gears will permit of developing the full efficiency of the turbine, as high pressure produced by the said compressors will produce the high speed required to develop said efficiency of the turbine. The clutch mechanism 48 permits of the said compressors being entirely thrown out of operation at any desired moment, whereby the motor mechanism of the vehicle will consist merely of the disconnected engine 4 and the rotary motor 7, but even this combination will produce extraordinarily satisfactory results in so far as vibration and noise are concerned, but the efficiency, however, of the turbine, when supplied only with the exhaust from the engine, is so low as to be almost negligible when compared with the real efficiency produced by the combination of the hot, gaseous exhaust with air, under sufficient pressure to rotate the turbine, irrespective of the load thereon, at efficient speeds.

Having thus described our invention, what we claim and desire to secure by Letters Patent is:

1. The combination, comprising a reciprocating, internal-combustion, hydrocarbon engine of the compression type, a rotary fluid impact motor operatively connected to a common engine with said internal-combustion engine, means, including an air compressor and a reservoir, for supplying motive power to said rotary motor, a clutch mechanism arranged intermediate said engine and said compressor and adapted to optionally connect and disconnect said compressor and said engine, means for delivering a mixture of compressed air, generated by said compressor and exhaust gaseous products from said engine, into the working-chamber of said rotary motor, whereby pre-heating of the compressed air prior to its expansion is accomplished, automatic means for controlling the firing of the explosive charges in said internal-combustion engine and for simultaneously throttling the supply of explosive charges to said engine, and means for optionally cutting off communication between said reservoir and said rotary motor.

2. The combination, comprising a reciprocating, internal-combustion, hydrocarbon engine of the compression type, a rotary fluid impact motor operatively connected to a common engine shaft with said internal-combustion engine, means, including an air compressor and a reservoir, for supplying motive power to said rotary motor, a clutch mechanism arranged intermediate said engine and said compressor, and adapted to optionally connect and disconnect said compressor and said engine, means for delivering a mixture of compressed air, generated by said compressor, and exhaust gaseous products from said engine, into the working-chamber of said rotary motor, whereby preheating of the compressed air, prior to its expansion, is accomplished, means for controlling the firing of the explosive charges in said internal-combustion engine, means for throttling the supply of explosive charges to said engine, and means for optionally cutting off communication between said reservoir and said rotary motor.

Signed at New York, in the county of New York, and State of New York, this 19th day of October A. D. 1908.

MORTIMER EASTMAN.
WILLIAM EASTMAN.

Witnesses:
CHARLES E. WIRZ,
W. H. SWENARTON.